United States Patent
Caruana et al.

(10) Patent No.: US 9,070,059 B2
(45) Date of Patent: Jun. 30, 2015

(54) PORTABLE OBJECT WITH SELF SWITCHING DEVICE

(75) Inventors: Jean-Paul Caruana, Meudon Cedex (FR); Gregory Capomaggio, Meudon Cedex (FR)

(73) Assignee: GEMALTO SA, Meudon (FR)

( * ) Notice: Subject to any disclaimer, the term of this patent is extended or adjusted under 35 U.S.C. 154(b) by 854 days.

(21) Appl. No.: 12/866,059

(22) PCT Filed: Jan. 26, 2009

(86) PCT No.: PCT/EP2009/050848
§ 371 (c)(1),
(2), (4) Date: Aug. 4, 2010

(87) PCT Pub. No.: WO2009/098137
PCT Pub. Date: Aug. 13, 2009

(65) Prior Publication Data
US 2010/0327945 A1 Dec. 30, 2010

(30) Foreign Application Priority Data
Feb. 6, 2008 (EP) .................................... 08290104

(51) Int. Cl.
| | | |
|---|---|---|
| *H01H 47/00* | (2006.01) |
| *H01H 35/00* | (2006.01) |
| *H01H 83/18* | (2006.01) |
| *H02H 3/02* | (2006.01) |
| *H02H 3/42* | (2006.01) |
| *B23K 11/24* | (2006.01) |

(Continued)

(52) U.S. Cl.
CPC ........ *G06K 19/0723* (2013.01); *G06K 19/0701* (2013.01); *G06K 19/0705* (2013.01)

(58) Field of Classification Search
CPC .......... G06K 19/0701; G06K 19/0723; G06K 19/0705
USPC ......... 307/112, 113, 26, 130, 131; 340/572.1, 340/572.7
See application file for complete search history.

(56) References Cited

U.S. PATENT DOCUMENTS 6,202,927 B1 * 3/2001 Bashan et al. ................. 235/451
6,593,845 B1 * 7/2003 Friedman et al. .......... 340/10.33
(Continued)

FOREIGN PATENT DOCUMENTS

| | | |
|---|---|---|
| EP | 1 126 407 A2 | 8/2001 |
| GB | 2 310 067 A | 8/1997 |
| JP | 60-179891 A | 9/1985 |

(Continued)

OTHER PUBLICATIONS

Konin-Klijke (W0 2006/043236 A2).*
(Continued)

*Primary Examiner* — Rexford Barnie
*Assistant Examiner* — Rasem Mourad
(74) *Attorney, Agent, or Firm* — Osha Liang LLP

(57) ABSTRACT

A portable electronic device 1 comprising a battery 14 coupled with an electronic circuit 10-12 through a switching circuit 15 for switching on or off the supply voltage Vcc to the electronic circuit using the battery. The portable device comprises at least one electromagnetic field detection circuit 13 coupled with the switching circuit 15 to start the power supply to the electronic circuit 10-12 if an electromagnetic field is detected.

8 Claims, 2 Drawing Sheets

Figure 1:
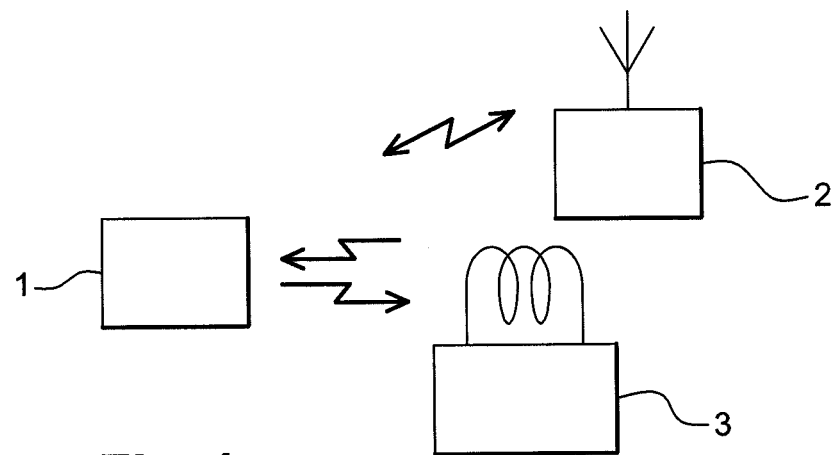

(51) Int. Cl.
*H02B 1/24* (2006.01)
*G06K 19/07* (2006.01)

(56) References Cited

U.S. PATENT DOCUMENTS

| | | | |
|---|---|---|---|
| 6,791,398 B1 * | 9/2004 | Lin et al. | 327/544 |
| 2007/0018832 A1 * | 1/2007 | Beigel et al. | 340/572.7 |

FOREIGN PATENT DOCUMENTS

| | | | |
|---|---|---|---|
| WO | 99/52061 A1 | 10/1999 | |
| WO | 2006/043236 A2 | 4/2006 | |
| WO | WO 2006043236 A2 * | 4/2006 | |

OTHER PUBLICATIONS

International Search Report from PCT/EP2009/050848 dated Apr. 29, 2009 (4 pages).
Written Opinion from PCT/EP2009/050848 dated Apr. 29, 2009 (6 pages).
Office Action mailed Feb. 5, 2013, for related Japanese Application No. 2010-545431 (English translation)(4 pages).
Patent Abstracts of Japan Publication No. 11-345292A with translated portions of Japan patent application No. 10-152460, dated Dec. 14, 1999 (3 pages).
Patent Abstracts of Japan Publication No. 2005-038037A with translated portions of Japan patent application No. 2003-197610, dated Feb. 10, 2005 (2 pages).
Patent Abstracts of Japan Publication No. 08-167014A with translated portions of Japan patent application No. 06-331422, dated Jun. 25, 1996 (2 pages).
Patent Abstracts of Japan Publication No. 2005-289204A with translated portions of Japan patent application No. 2004-106952, dated Jun. 25, 1996 (2 pages).

* cited by examiner

PORTABLE OBJECT WITH SELF SWITCHING DEVICE

The invention relates to a portable object with a self-switching device. More particularly, the self-switching device is used to switch on the power to the device at a given time with no human intervention.

The portable object referred to in this document comprises at least one electronic circuit and a battery to power the said circuit. Like any other battery-operated device, its operating time depends on the power consumed by the device and the battery charge capacity. In general, the charging capacity of a battery is proportional with its size. When an object is small but needs a large quantity of power to operate, it is imperative to switch off the power as soon as possible and to restore the power to the system every time it is used. To that end, the use of a switch or pushbutton that is controlled by the user every time they want to use the portable device is common. The power can then be switched off automatically whenever the object is no longer used.

For some uses, it may be necessary for no human intervention to be involved. In that case, a continuously operating device with a standby mode with lower power consumption may be used. However, the standby mode can sometimes use a large quantity of battery power. For example, if you consider a company access card that communicates using a radiofrequency communication protocol of the Wi-Fi, Bluetooth, HiperLAN or other type, the standby mode required for detecting communication requires powering an input amplifier with fairly high power needs. Even if the standby mode helps save the power consumed by the device, that is not enough for a battery with a very small capacity such as those found in credit-card sized cards. That is why a solution was required for further reducing the consumption of such devices.

Besides, the user of transponders that are self powered by a magnetic field that further enables communication is known. The use of such methods for electronic tags that are also called RFID tags, for instance to identify products in a trolley or to count objects of animals, is known. Such communication may also be used for relatively complex applications that may include payment or electronic passports. There are different standards for defining the objects using such communication, including standard ISO/IEC 14443. These different standards are grouped under the acronym NFC (Near Field Communication). The main drawbacks of NFC type devices are firstly the low speed of data transfer and secondly the limited communication and powering distance of the device. That is because it is necessary for the device to remain within the electromagnetic field as long as it is to be used. Now, that is not suitable for uses where the card may have to go rapidly through a field, at the same time communicating a certain volume of data.

The invention proposes a battery-powered device, the powering of which is triggered by detecting an electromagnetic field. The power may be fully shut down as long as no field is detected.

More particularly, the invention relates to a portable electronic device with a battery coupled with an electronic circuit through a switching circuit that makes it possible to switch on or off the power to the electronic circuit with the battery. The portable object comprises at least one electromagnetic field detection circuit coupled with the switching circuit to start the power to the electronic circuit if an electromagnetic field is detected. The switching circuit is powered self-selectively either by the battery or by the electromagnetic field.

Preferentially, the electromagnetic field detection circuit may be self powered by the electromagnetic field. The magnetic field detection circuit can power the switching circuit during at least one phase of the start of the supply of power. The field detection circuit may have a resonant circuit and a rectification and regulation circuit. The resonant circuit is associated with a frequency range so that alternating voltage is created at its terminals in the presence of an electromagnetic field with a frequency located within the frequency range. The rectification and regulation circuit transforms the alternating voltage into direct voltage.

In variants of embodiment, the switching circuit may have a pushbutton to start the supply of power to the electronic circuit from the battery. The switching circuit may comprise an input connected to the electronic circuit to trigger the cutting off of the power to the said electronic circuit. The switching circuit may be an electronic relay. The switching circuit may comprise a transistor and a latch. The transistor is used to establish or cut off the power supply voltage to the electronic circuit. The latch is of the bistable type to control the transistor, and is powered self-selectively by the battery and the electromagnetic field detection circuit.

Figure 2:
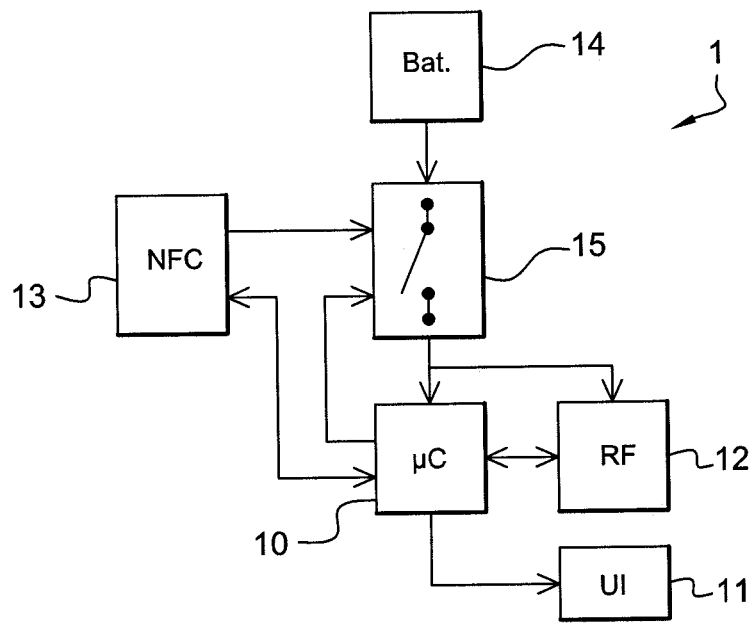
Figure 3:
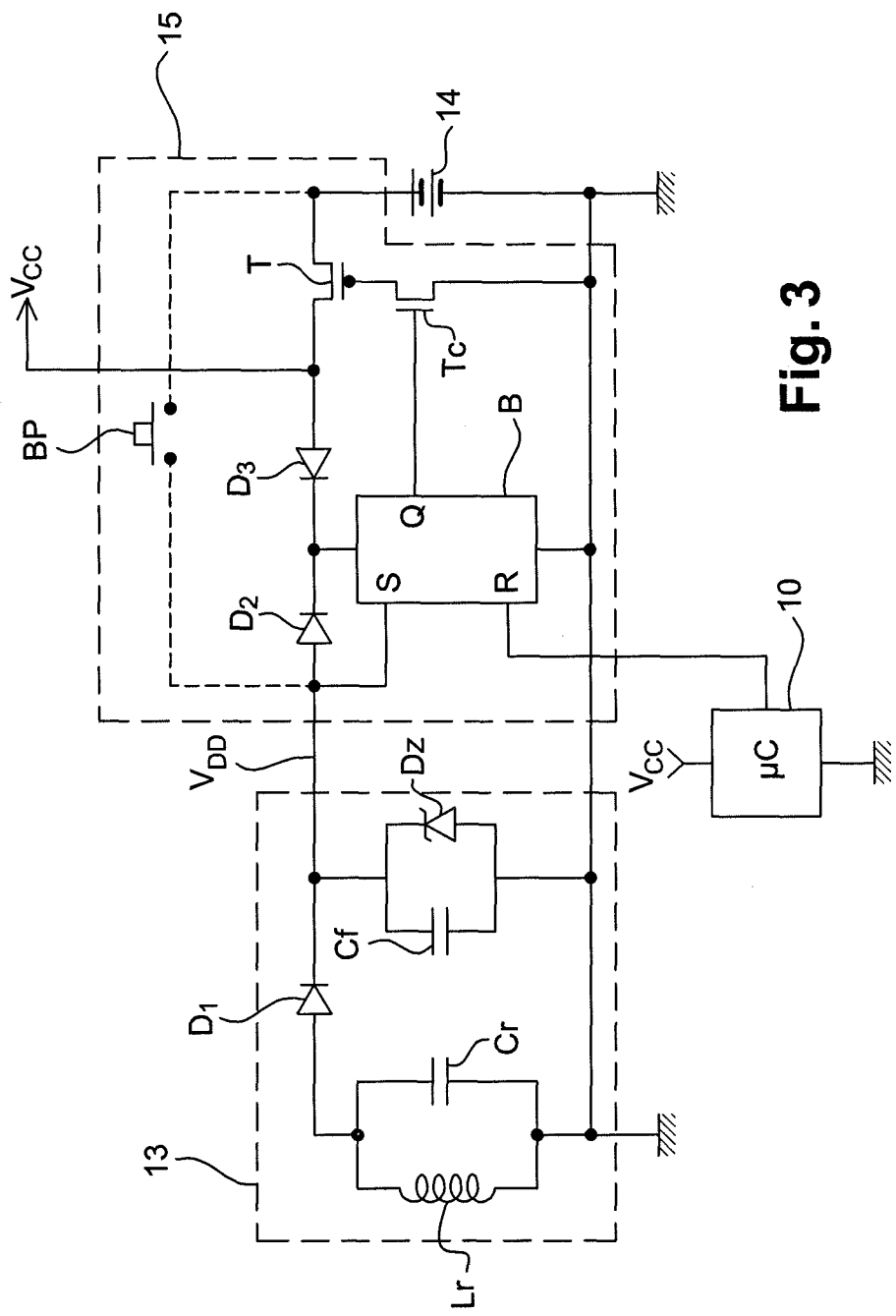

The invention will be better understood and other particularities and benefits will become clearer in the description below, which refers to the attached drawings, where:

FIG. 1 represents a device according to the invention in an operating environment, FIG. 2 represents an example of embodiment of a device according to the invention, and FIG. 3 details the part of the device relating to the switching circuit in the invention.

FIG. 1 represents a portable electronic device 1 in its environment of use. The portable device 1 is for example a card designed to communicate by radiofrequency with a base station 2. For example, the card is designed for a person moving inside a company, to whom information is to be sent about the jobs they need to carry out. The company further has access control terminals 3 for recording the passages of the person. The checking time is very brief and does not make it possible to exchange more than an identifier to check whether or not that person is authorised. The terminals 3 may also be used for other uses independent of cards 1, the key feature being that the terminals 3 emit an electromagnetic field that is sufficiently great to be detected, and for example compliant with a standard of the NFC type, e.g. ISO/IEC 14443.

An example of a functional embodiment of the card 1 is shown in FIG. 2. For example, the card 1 may comprise a microcontroller 10, a user interface 11, a radiofrequency interface 12, a proximity communication interface 13, a battery 14 and a switching circuit 15. The microcontroller 10 is typically made up of at least one microprocessor and at least one memory that implement at least one program to control all the elements 11 to 14 that make up the card 1.

The user interface 11 enables the card to interact with a user. For example, the user interface may comprise a small LCD screen that may be integrated into a card of the credit-card size, a beep generator to report that a message has arrived, a fingerprint reader or a mini keypad.

The radiofrequency interface 12 is a communication interface with a range located from a few dozen to a few hundred meters. The radiofrequency interface 12 is for instance compliant with one of the following standards—Bluetooth (IEEE 802.15.3), Zigbee (IEEE 802.15.4), Wi-Fi (IEEE 802.11) or other standards.

The proximity communication interface 13 is an interface that may comply with standard ISO 14443. However, in the invention and as detailed below, the interface may be limited to the part relating to the recovery of power.

The battery 14 is a small battery, thus offering a small capacity. The switching circuit 15 is used to connect the battery to the elements of the card 1 or otherwise, with the exception of the NFC interface 13, which has its own power supply.

FIG. 3 particularly details the part relating to the power supply of card 1. The interface NFC 13 is reduced here to its part concerning the recovery of power. For the invention, it is not necessary to have an electromagnetic field modulation/demodulation circuit. The NFC interface 13 has a resonant circuit that is made up of inductor Lr and a capacitance Cr tuned, for example, to a frequency of 13.56 MHz which is that of the access control terminals. The resonant circuit is coupled to a diode $D_1$ that has the task of rectifying the signal. A capacitor Cf then filters the signal supplied by diode $D_1$. A Zener diode Dz in parallel on the capacitor Cf regulates the rectified and filtered voltage so that it is within a frequency range that is compatible with the power supply of an integrated circuit. This type of NCF interface 13 is well known to the man of the art and different variants are possible.

The switching circuit 15 is an electronic relay. A transistor T is used to connect the positive terminal of the battery 14 through its channel to a power output of the switching circuit 15 to supply the Vcc power supply voltage to the other elements of the card 1. A bistable latch B of the SR (Set-Reset) type is connected to the gate of the transistor T to make it conduct or not through a control transistor Tc. The bistable latch is powered both by the NFC interface and by the Vcc power supply voltage through two diodes $D_2$ and $D_3$. In that way, when the channel of transistor T is open, the latch B must be powered by the diode D2 and the NFC interface to operate. If the transistor T is shut, the latch B is powered by the diode D3 and the battery 14. The latch can maintain a 1 output status, making the control transistor Tc and transistor T conduct. If ever the output status of the latch switches to 0, the control transistor Tc is blocked and the leakage current from the transistor gate brings it to the same potential as its substrate, thus blocking transistor T. When transistor T is blocked, the battery 14 is disconnected from the other elements of the card 1.

In order to control the power supply to the card, an input S of the latch B is connected to the Vdd potential supplied by the interface NFC 13. The input S is an input that sets the latch B to 1. In that way, as soon as the voltage Vdd reaches a level sufficient to power latch B, its output is set automatically to 1. The switching of transistor T maintains that level on 1 when the Vdd voltage drops, particularly because the movement of the card makes the level of the electronic magnetic field drop too low to supply sufficient power to power latch B.

In order to control the power supply to the card, an input R of latch B is connected to an output of microcontroller 10. The input R is a latch B resetting input. The microcontroller output just has to be kept at 0 as long as the card is to be powered. Switching to 1 may be triggered by the microcontroller after a predefined time during which the card is idle, i.e. when there is no exchange of messages via the RF interface 12 or no action is taken from the user interface 1. Switching input R to one sets the output of latch B to zero, and thus blocks the control transistor Tc and transistor T, thereby cutting off the power supply to all the elements of card 1.

The switching circuit 15 behaves like a bistable electromechanical relay that sets a switch to the open or closed position depending on two set voltages. However, in view of the small size of credit-card sized cards, it is preferable to have the described circuit, which can be integrated on an integrated circuit.

Optionally, it is possible to add a pushbutton BP that connects the output of the battery to the voltage input from the NFC interface. In that way, the power supply to the card can be started in the absence of the electromagnetic field by pressing the pushbutton BP. The pressure applied in this way simulates the entry into an electromagnetic field by the card.

Numerous variants of the switching circuit 15 are possible. The main usefulness of the switching circuit 15 is that it switches the voltage supplied by the battery depending on two control signals, one of which comes from the detection of an electromagnetic field. However, the man of the art may note that the offered circuit is not powered when the battery is cut off, which has an added advantage for the previously presented mode of embodiment.

The invention claimed is:

1. A portable electronic device comprising:
   an electronic circuit;
   a switching circuit, comprising: a first diode, a second diode, and a transistor;
   at least one electromagnetic field detection circuit; and
   a battery coupled with the electronic circuit through the switching circuit that makes it possible to switch on and off a power supply voltage to the electronic circuit using the battery, the transistor establishing a cutting on and off the power voltage to the electronic circuit by the battery,
   wherein the at least one electromagnetic field detection circuit is coupled with the switching circuit to start the supply of power to the electronic circuit if an electromagnetic field is detected, and
   wherein the switching circuit is powered through the first diode by the battery when the transistor is on and the switching circuit is powered through the second diode by the electromagnetic field when the transistor is off.

2. The portable electronic device of claim 1, wherein the electromagnetic field detection circuit is self powered by the electromagnetic field.

3. The portable electronic device of claim 2, wherein the electromagnetic field detection circuit powers the switching circuit at least during the power supply starting stage.

4. The portable electronic device of claim 2, wherein the electromagnetic field detection circuit comprises:
   a resonant circuit associated with a frequency range, at the terminals of which an alternating voltage is created in the presence of the electromagnetic field whose frequency is situated within the frequency range,
   a rectification and a regulation circuit configured to transform an alternating current into direct current.

5. The portable electronic device of claim 1, wherein the switching circuit has a pushbutton (BP) to start the power supply to the electronic circuit from the battery.

6. The portable electronic device of claim 1, wherein the switching circuit comprises an input connected to the electronic circuit to trigger the cutting off of the power to the electronic circuit.

7. The portable electronic device of claim 1, wherein the switching circuit is an electronic relay.

8. The portable electronic device of claim 1, wherein the switching circuit further comprises
   a latch of the bistable type to control the transistor.

* * * * *